United States Patent
Leinweber et al.

(12) 
(10) Patent No.: US 6,184,842 B1
(45) Date of Patent: Feb. 6, 2001

(54) PROCESS FOR MANUFACTURING A RADOME FOR A RANGE WARNING RADAR

(75) Inventors: Ulrich Leinweber, Boll; Werner Zimmermann, Putzbrunn; Wolfgang Lauer, Heilbronn, all of (DE)

(73) Assignee: DaimlerChrysler, Stuttgart (DE)

( * ) Notice: Under 35 U.S.C. 154(b), the term of this patent shall be extended for 0 days.

(21) Appl. No.: 09/303,431

(22) Filed: May 3, 1999

(30) Foreign Application Priority Data

May 2, 1998 (DE) ................................ 198 19 709

(51) Int. Cl.$^7$ ........................................ H01Q 1/42
(52) U.S. Cl. ................................ 343/872; 156/60
(58) Field of Search ....................... 343/872, 756, 343/909; 29/600; 156/60; 427/294

(56) References Cited

U.S. PATENT DOCUMENTS

| 5,283,592 | * | 2/1994 | Bogorad et al. ............... 343/872 |
| 5,368,924 | * | 11/1994 | Merrill, Jr. et al. ............ 428/241 |
| 5,625,369 | * | 4/1997 | Newman ...................... 343/872 |

* cited by examiner

*Primary Examiner*—Tan Ho
(74) *Attorney, Agent, or Firm*—Evenson, McKeown, Edwards & Lenahan, P.L.L.C.

(57) ABSTRACT

A radome for a range warning radar system has metallic structures, such as a manufacturer's symbol or a characteristic structure, formed therein. Surfaces of the characteristic structure are coated with a metallic or metallically glossy layer which is transparent to electromagnetic radiation of the radar system and reflects visible light.

21 Claims, 4 Drawing Sheets

PROCESS FOR MANUFACTURING A RADOME FOR A RANGE WARNING RADAR

BACKGROUND AND SUMMARY OF THE INVENTION

This application claims the priority of German patent document 198 19 709.8, filed May 2, 1998, the disclosure of which is expressly incorporated by reference herein.

The invention relates to a range warning radar dome made of a radar transparent material which has a metallically glossy layer, and to a method of manufacturing such a radar dome.

According to the current state of the art, radar radomes are designed with the thickness of the radome and the dielectric material constant is coordinated with the wavelength of the frequency which is used. In this manner, reflection losses at boundary surfaces, the absorption losses at boundary surfaces and absorption losses in the radome material can be minimized.

A design which includes a maker's emblem in a raised form within a visually partially transparent radome structure in a Range Warning Radar (RWR) system, has not been known so far.

Also new is the provision of a scratch-resistant surface made of $SiO_2$ on or in combination with a radome. Such a scratch-resistant $SiO_2$-layer can be applied by a sol-gel technique or by Chemical Vapor Deposition (CVD= depositing layers of material on a substrate from the gaseous phase).

It is an object of the present invention to provide a process and apparatus such as described above, by means of which characteristic structures having a specific appearance can be provided; with simultaneous full radar transparency, without influencing the propagation of the radar waves, and maintaining the imaging characteristics of the radome.

This and other objects and advantages are achieved by the method and apparatus according to the invention, in which a cover plate of the radar dome is both radar transparent and visually transparent. An emblem or other symbol is molded into the cover plate in negative relief and is provided with a metallically glossy layer, whose thickness is such that visible electromagnetic waves are reflected, and longer wave (radar) electromagnetic radiation is transmitted with substantially no attenuation.

Other objects, advantages and novel features of the present invention will become apparent from the following detailed description of the invention when considered in conjunction with the accompanying drawings.

DETAILED DESCRIPTION OF THE INVENTION

The general idea of the invention to integrate a manufacturer's symbol, emblem or characteristic structures of motor vehicle parts into the radar dome itself, and to provide the represented symbols with a for example, metallic, chrome-glossy appearance, while maintaining full radar transparency, and without influencing the propagation of radar waves due to diffraction, refraction, dispersion and reflection. In this manner the imaging characteristics of the radome are fully maintained. In addition, the radome may also have the form and function of a lens.

Figure 1:
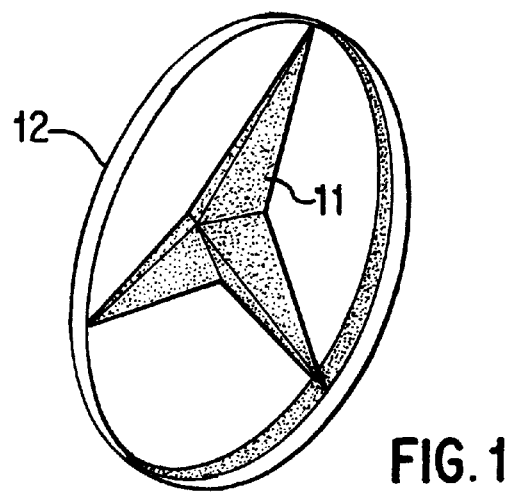
FIG. 1 is a perspective view of an embodiment of a radome in the form of a maker's emblem.

The firm emblem 10 illustrated in FIGS. 1 and 2 can be contructed as a radome as follows: In a known manner, it is composed of a star 11 and of a ring 12 enclosing it. The three pointed star 11 has a chrome-colored coating, is radar-transparent and embedded in a transparent cover layer. The ring 12 is a transparent thermoplastic material which has a dark-colored, opaque or corresponding coating, and preferably scratch-resistant coating, as well.

Figure 2:
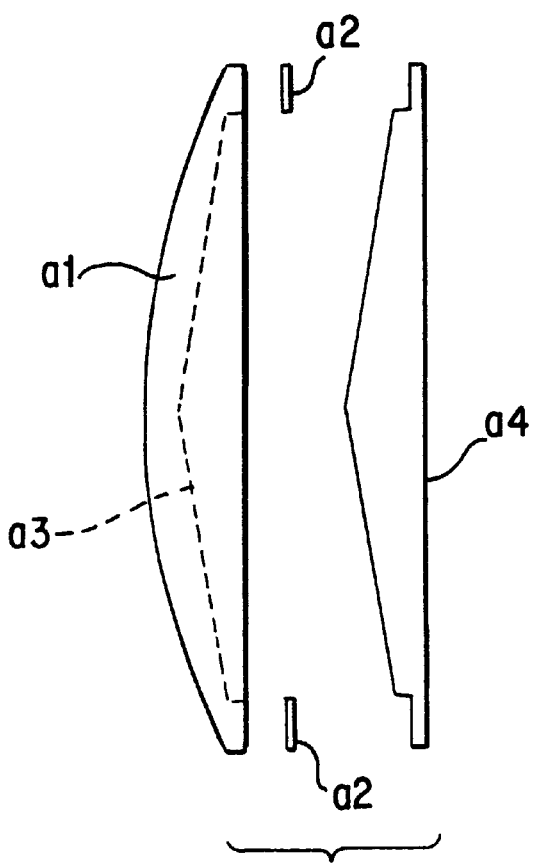
FIG. 2 is a cross-sectional view of a radome according to FIG. 1.

As shown in FIG. 2, the above-mentioned radome therefore consists of a radar-transparent and visually transparent cover plate a1 made of a material which exhibits low dielectric losses —for example, polycarbonate. In this cover plate, the structure or the maker's emblem is now integrated in negative relief a2; that is, viewed from the backside it is formed as a recess. The backside of the cover plate a1 is preferably provided with a mask of a black paint coat so that the residual surfaces (those surfaces which do not belong to the negative relief) are covered during the working operation which follows for the metallic coating of the emblem 10 or of the structure.

Figure 5:
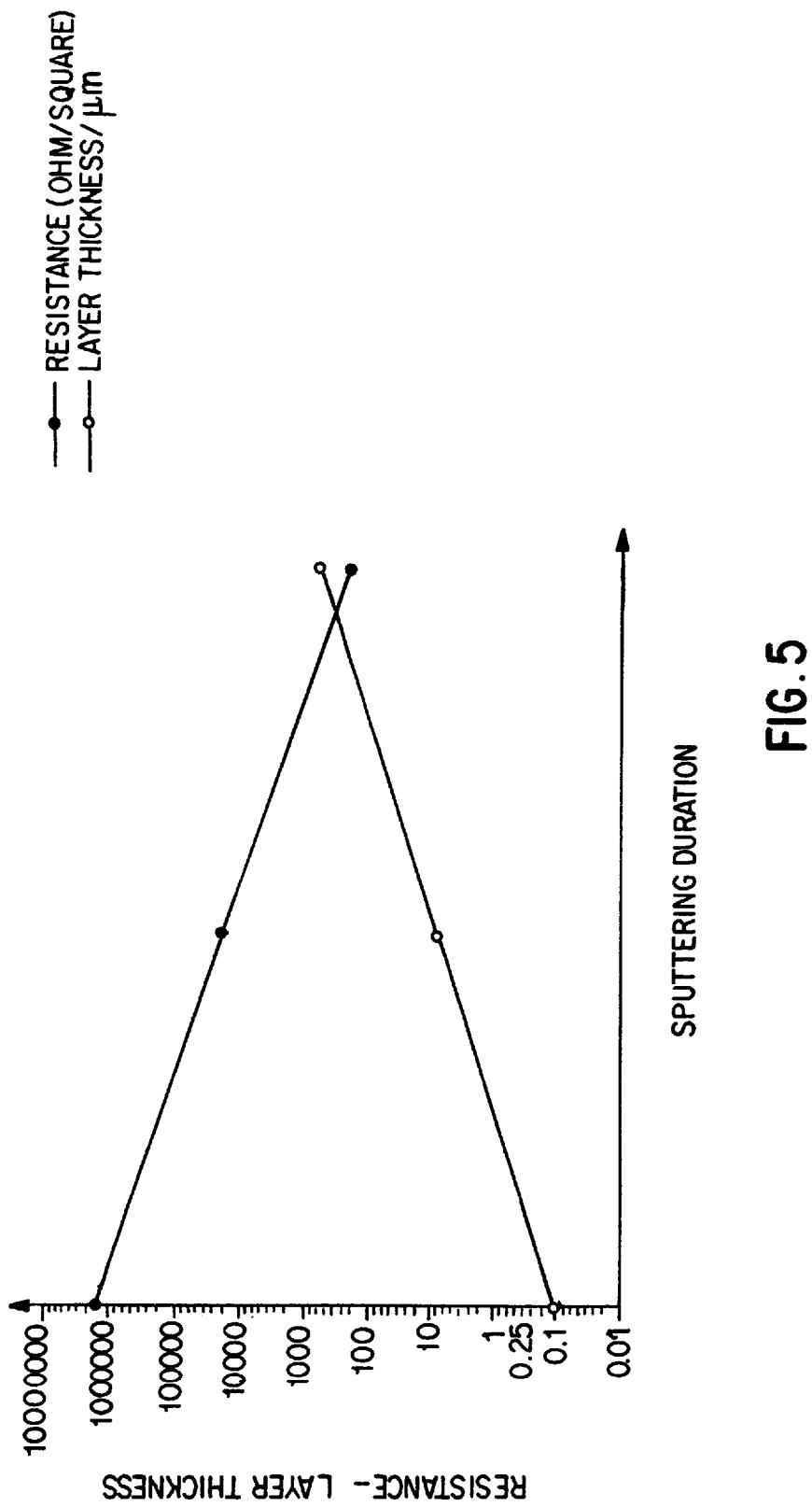
FIG. 5 is a diagram which illustrates the sputtering duration and the layer thickness for chrome on polycarbonate material.

The formed maker's emblem 10 is provided with a metallic or a metallically glossy layer a3. This layer has a thickness such that, within the visible wavelength range, electromagnetic radiation (light) is completely reflected, but the longer-wave radar waves penetrate almost without attenuation. The thickness of the metallic coating can be determined experimentally for various metallic coating materials; a respective diagram is indicated in FIG. 5.

In order to prevent distortions of the penetrating electromagnetic field because of the geometry of the backside surface, another polycarbonate layer, which is dyed in a dark color, is sprayed onto the backside of the transparent partially coated cover plate, or a plate of polycarbonate a4 is glued on in a form-locking manner. It is understood that in this case no inhomogeneities as the result of air bubbles, etc. must occur in the boundary layers.

To protect the radome surface from mechanical or chemical influences, a radar-transparent ceramic cover layer made of $SiO_2$ of a thickness of only a few $\mu$m is applied by means of chemical vapor deposition. Scratch-resistant radar-transparent coatings can be applied in a known manner also by means of the paint-coating or the sol-gel technique. For the cover plate a1 of the radome and the backside spraying, only materials are used which do not differ (or differ only slightly) in their dielectricity constant; and, as customary in radome construction, its thickness is coordinated with the wavelength of the corresponding radar frequency and to the angle of incidence in order to ensure constructive inference in the radome material.

As a result of the above-suggested measures, the metallically glossy object a3 which is embedded in the clear polycarbonate a1 will now appear for the viewer in a top view before a dark background. Because of the homogeneity of the body in the resolution range of the wavelength, the material of the radome appears homogeneous for the radar wave.

Figure 3:
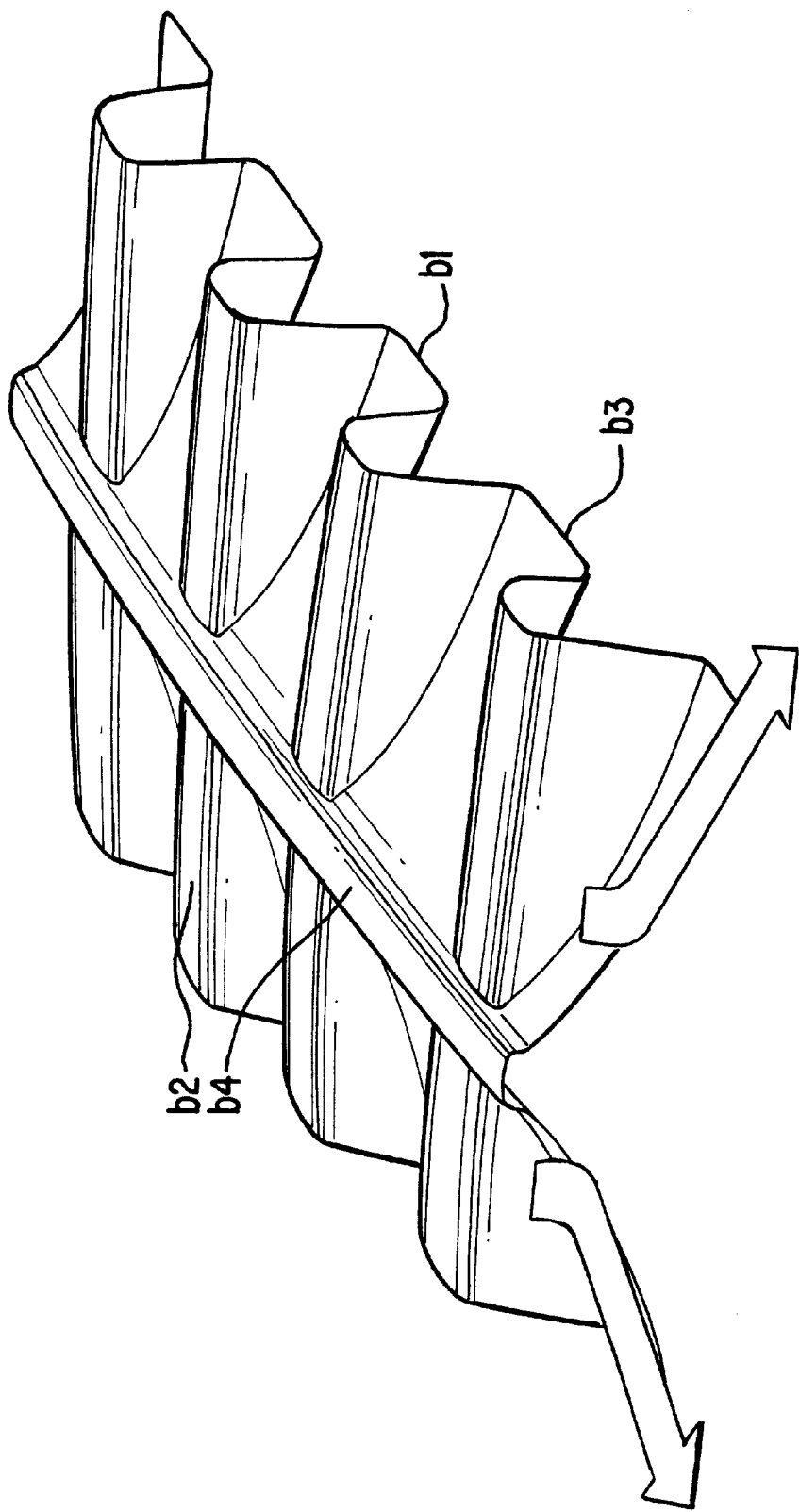
FIG. 3 is a perspective view which illustrates the fabrication of an embodiment of the invention, using a radome in a deep-drawing technique.

After the above explanation of the radome construction for the range warning radar, the radome construction using a deep-drawing technique is now described, and is illustrated in FIG. 3. The starting material to be used for the radome consists of a radar-transparent, stiff but thin foil material b1. As common in the deep-drawing and blister technique, the foil material, while being simultaneously heated, is pulled by means of a vacuum over a shape which corresponds to the desired geometry to be represented. In the illustrated embodiment, the forming tool has the geometry of a radiator grille b1. (The shape is selected such that only a few partial rays of the penetrating radar waves impinge diagonally or in a grazing manner on the surfaces of the dielectric or of the foil.)

For representing metallic parts, the foil is vapor-deposited or sputtered before or after the shaping by means of a metallic layer b2. Coating with special metallically glossy, non-metallic paints is also possible. It is important that the shape is designed such that it has no recesses or indentations in which water or snow can accumulate because of the air stream, but this can automatically be deflected by the wind pressure from the radome, as illustrated in FIG. 3 at 3b, where the illustrated radiator grille structure is open on the side in order to be able to deflect rain water and snow. Reference number b2 indicates the chrome-colored vapor-deposition or sputtering of the radome structure and b4 indicates a transparent protective layer.

Figure 4:
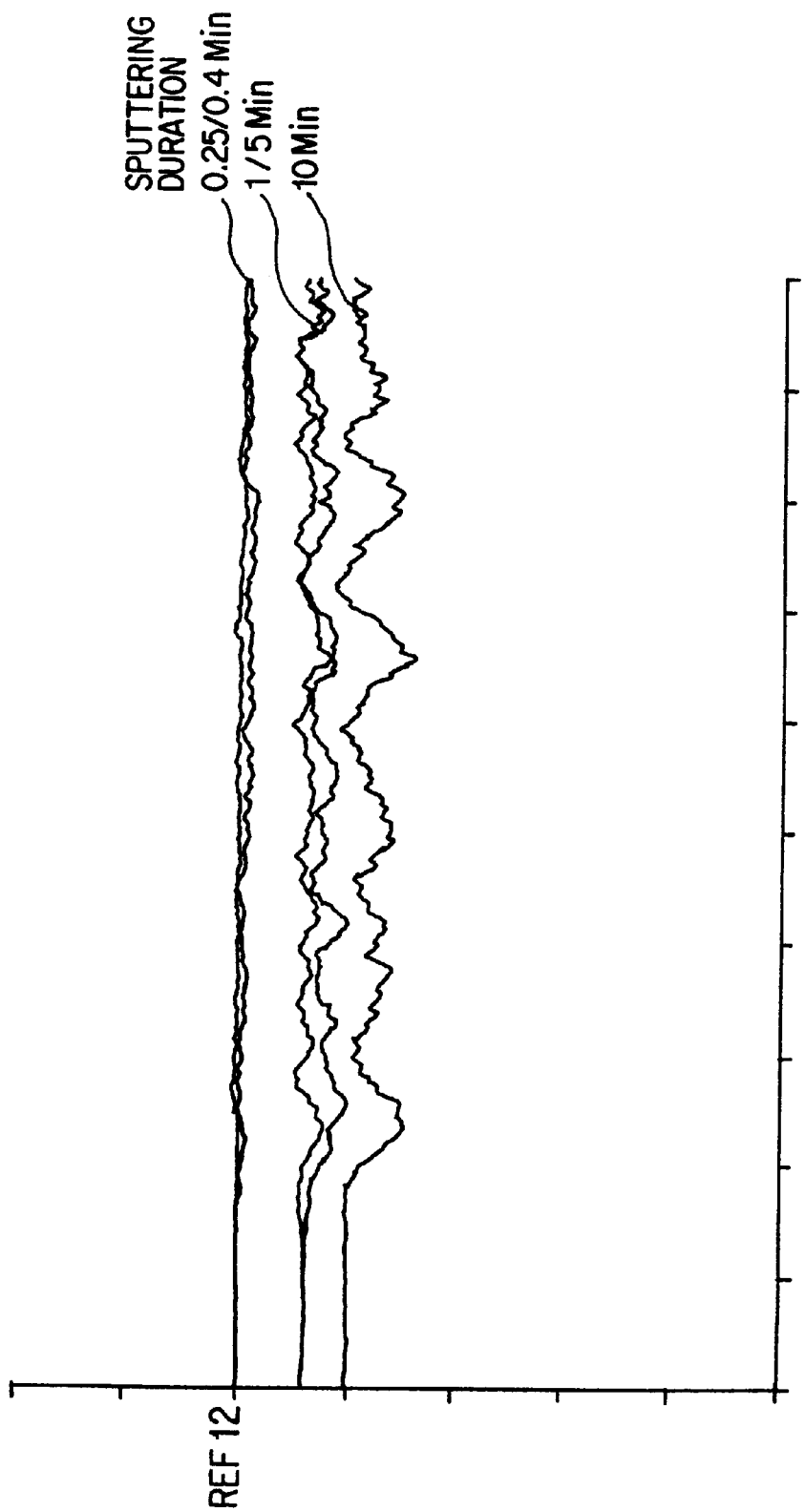
FIG. 4 is a diagram which illustrates to the weakening of radar waves transmitted through a sputtered metal layer.

As mentioned above, the metallically glossy areas are printed on, sputtered on or vapor-deposited on. The thickness of the metallic layer is selected, for example, as a function of the sputtering duration such that, for radar frequencies, a full transparency is still ensured. This takes place by means of the control of the ohmic resistance of the metal layer or by means of transmission measurements at microwave frequencies or by means of the duration of the coating process. Information in this respect is indicated in the diagrams in FIGS. 4 and 5 of the drawing.

Finally, to protect the metallic coating from corrosive and mechanical influences, it is recommended to apply a scratch-resistant paint coat to the metal layer or to use an $SiO_2$-layer b4 by means of chemical vapor deposition for this purpose.

The above-described radar-transparent processes are distinguished in that metallic structures can be represented by the coating of contours with metallic materials or with non-metallic paint coats which are metallically glossy because of interference effects without significantly influencing the imaging characteristics. This permits the integration of a trademark or characteristic structural shapes and, for example, to in the case of range warning systems, ensures their proper functioning.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for manufacturing a radome for a radar system, which radome has a visible emblem or characteristic structure formed therein, said process comprising:
   providing a radar-transparent and visually transparent cover plate;
   forming the emblem or characteristic structure in a surface of the cover plate; and
   applying a metallic or metallically glossy layer to the emblem or characteristic structure;
   wherein a thickness of the metallic or metallically glossy layer is such that it reflects visible electromagnetic radiation substantially completely, while radar waves penetrate such layer substantially unattenuated.

2. The process according to claim 1, further comprising:
   before the applying step, providing a backside of the cover plate with a dark layer or mask to cover residual surfaces.

3. The process according to claim 2, wherein the cover plate is formed of polycarbonate.

4. The process according to claim 2, wherein the dark layer comprises a black paint coat.

5. The process according to claim 1, wherein the cover plate is formed of polycarbonate.

6. The process according to claim 1, further comprising at least one of the following:
   providing a backside of the transparent cover plate with a sprayed-on polycarbonate layer;
   providing the backside of the transparent cover plate with a plastic with dielectric characteristics, similar to those of the cover plate; and
   gluing the cover plate to a polycarbonate plate.

7. The process according to claim 1, wherein the radome surface is provided with a radar-transparent ceramic cover layer made of $SiO_2$ of a thickness of a few $\mu$m.

8. The process according to claim 1 wherein:
   a thickness of the radome is coordinated with a radar frequency of the radar system and with the angle of incidence of radar waves impinging on the radome.

9. The process according to claim 1, wherein metallically glossy, non-metallic paint coats are used for representing metallic structural parts.

10. The process according to claim 9, wherein metallically glossy structural areas are printed on, sputtered on or vapor-deposited on.

11. The process according to claim 1, wherein the metallic or metallically glossy layer is provided with one of a scratch-resistant paint coat and an $SiO_2$-layer.

12. A process for manufacturing a radome for a radar system, which radome has a visible emblem or characteristic structure formed therein, said process comprising:
   heating and simultaneously pressing, a radar-transparent thin foil material over a shape forming the desired structure, by means of a vacuum;
   wherein, the foil material is provided with a preset stiffness and has one of a metallic layer and a non-metallic paint coat provided thereon.

13. The process according to claim 12, wherein the radome surface is provided with a radar-transparent ceramic cover layer made of $SiO_2$ of a thickness of a few $\mu$m.

14. The process according to claim 12 wherein:
   a thickness of the radome is coordinated with a radar frequency of the radar system and with the angle of incidence of radar waves impinging on the radome.

15. The process according to claim 12, wherein the structure is shaped such that rays of penetrating radar waves substantially impinge on surfaces of the dielectric or the foil in other than a diagonal or grazing manner.

16. The process according to claim 12, wherein metallically glossy, non-metallic paint coats are used for representing metallic structural parts.

17. The process according to claim 12, wherein the metallic or metallically glossy layer is provided with one of a scratch-resistant paint coat and an $SiO_2$-layer.

18. A radome for a radar system, comprising:
   a covering member formed of a radar-transparent material;
   a selected characteristic structure or symbol formed in a surface of said covering member; and a visible metallic or metallically glossy layer on a surface of said characteristic structure or symbol;

wherein a thickness of the metallic or metallically glossy layer is such that electromagnetic radiation of said radar system penetrates it substantially without attenuation.

19. The radome according to claim 18, wherein:

the radar-transparent material is also visually transparent and is formed to provide a cover plate; and the characteristic structure or symbols integrated in the cover plate in negative relief.

20. The radome according to claim 18, wherein:

the radar-transparent material comprises a thin foil material provided with a certain stiffness; and the characteristic structure or symbol is formed by heating and pressing by means of a vacuum over a form having a desired structure.

21. The radome according to claim 18, further comprising: a radar-transparent ceramic cover layer made of $SiO_2$.

* * * * *